United States Patent [19]

Welt

[11] 4,348,034
[45] Sep. 7, 1982

[54] COLLAPSIBLE CARTS AND SUPPORTS FOR CAMERAS AND THEIR EQUIPMENT

[75] Inventor: David I. Welt, Miami, Fla.

[73] Assignee: Welt/Safe-Lock, Inc., Hialeah, Fla.

[21] Appl. No.: 189,582

[22] Filed: Sep. 23, 1980

Related U.S. Application Data

[63] Continuation-in-part of Ser. No. 26,788, Apr. 3, 1979, abandoned.

[51] Int. Cl.³ .............................................. B62B 1/12
[52] U.S. Cl. ..................................... 280/35; 248/168; 280/655; 280/47.29
[58] Field of Search ........ 280/651, 652, 655, 47.13 R, 280/47.29, 35; 403/350; 248/163, 168, 170, 434; 182/20, 21

[56] References Cited

U.S. PATENT DOCUMENTS

| | | | |
|---|---|---|---|
| 1,747,600 | 2/1930 | Reardon | 280/47.33 X |
| 2,293,460 | 8/1942 | Friend | 280/47.33 X |
| 2,500,588 | 3/1950 | Vosseler et al. | 280/655 |
| 2,801,861 | 8/1957 | Hanson | 280/655 X |
| 3,259,407 | 7/1966 | Welt | 403/350 |
| 3,826,513 | 7/1974 | Wolf | 280/47.13 X |
| 3,863,945 | 2/1975 | Dunstan | 280/79.1 A X |
| 4,009,891 | 3/1977 | Jensen | 280/651 |
| 4,037,858 | 7/1977 | Adams | 280/47.29 X |

Primary Examiner—Joseph F. Peters, Jr.
Assistant Examiner—Michael Mar
Attorney, Agent, or Firm—Erwin M. Barnett

[57] ABSTRACT

A two-wheeled collapsible cart comprises a transverse bar having one wheel mounted on a caster fork beneath each opposite end thereof, a pair of symmetrically spaced bars pivotally mounted on the transverse bar providing therewith a collapsible platform and a pair of upstanding barrier bars. The bottom end of a lowermost section of an extendable leg of a camera tripod or unipod from which the non-slip cap has been removed is fitted with an element of a separable connector which engages a companion element mounted on a midportion of the transverse bar. Each spaced pivoted bar terminates in a downturned foot which cooperates with the wheels as a four point ground engaging support for the platform and the mounted upstanding tripod or unipod when the bars are in extended position. The handle of a conventional pan head which adjustably supports the camera on the tripod or unipod also serves as a manipulative handle for the cart when the platform, carrying the camera equipment, is tilted from the four point ground engaging position for transport on the two wheels. A strap is located for encircling the three tripod legs for retention in closed parallel position when the legs are retracted.

6 Claims, 13 Drawing Figures

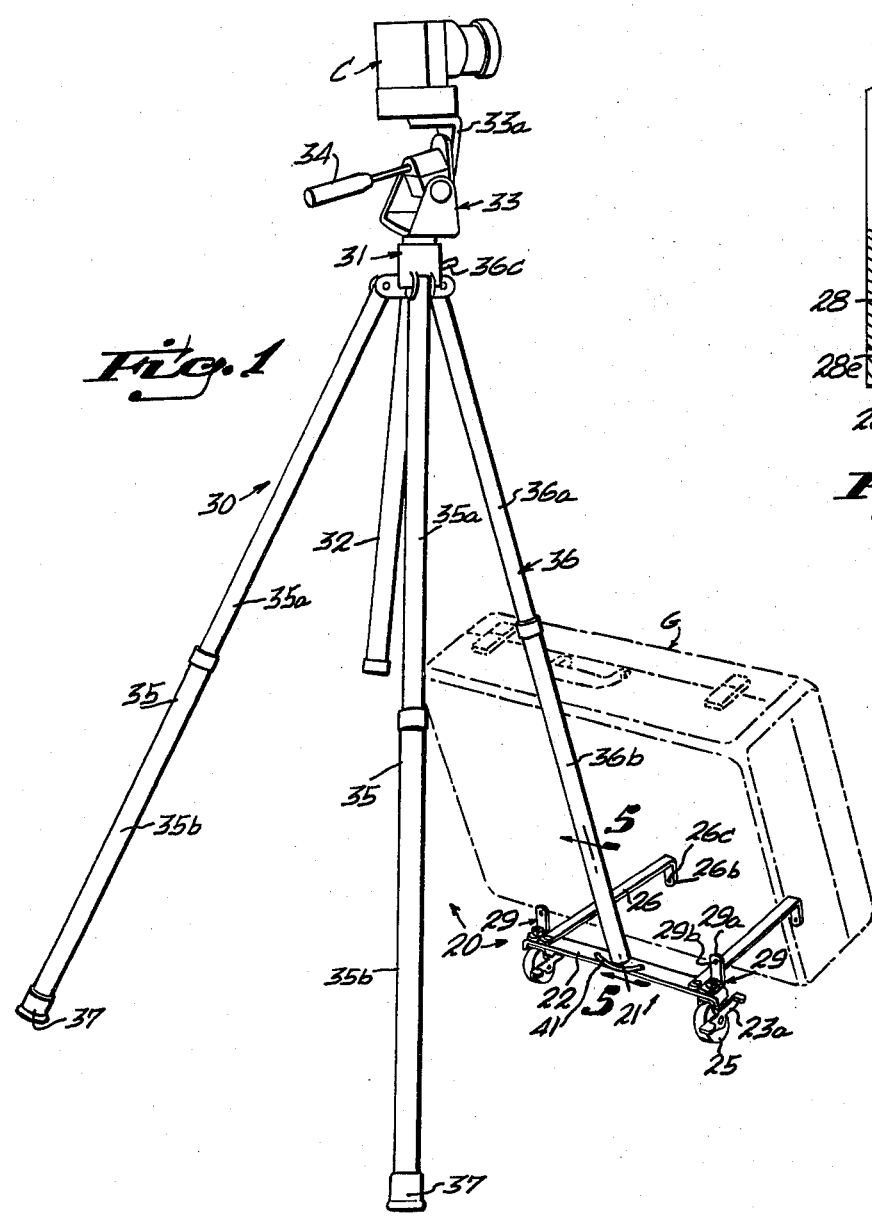
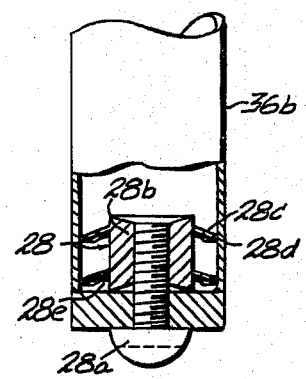
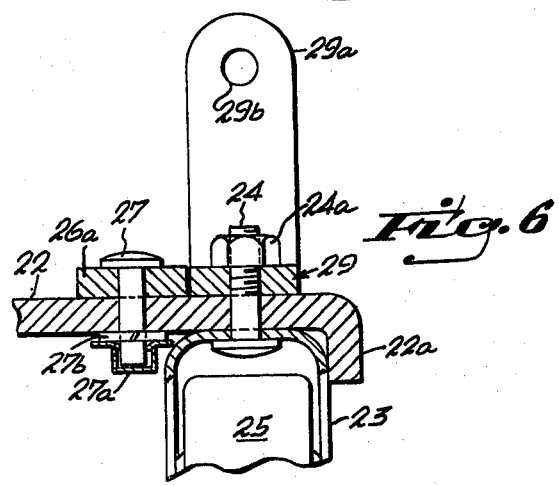
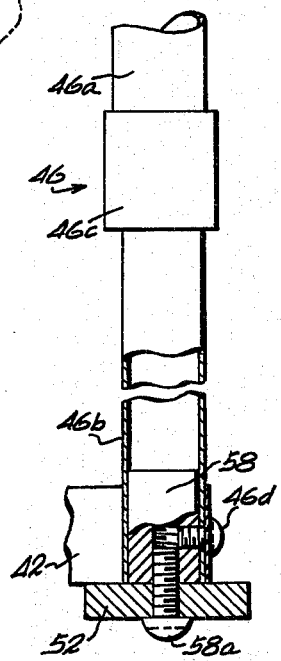

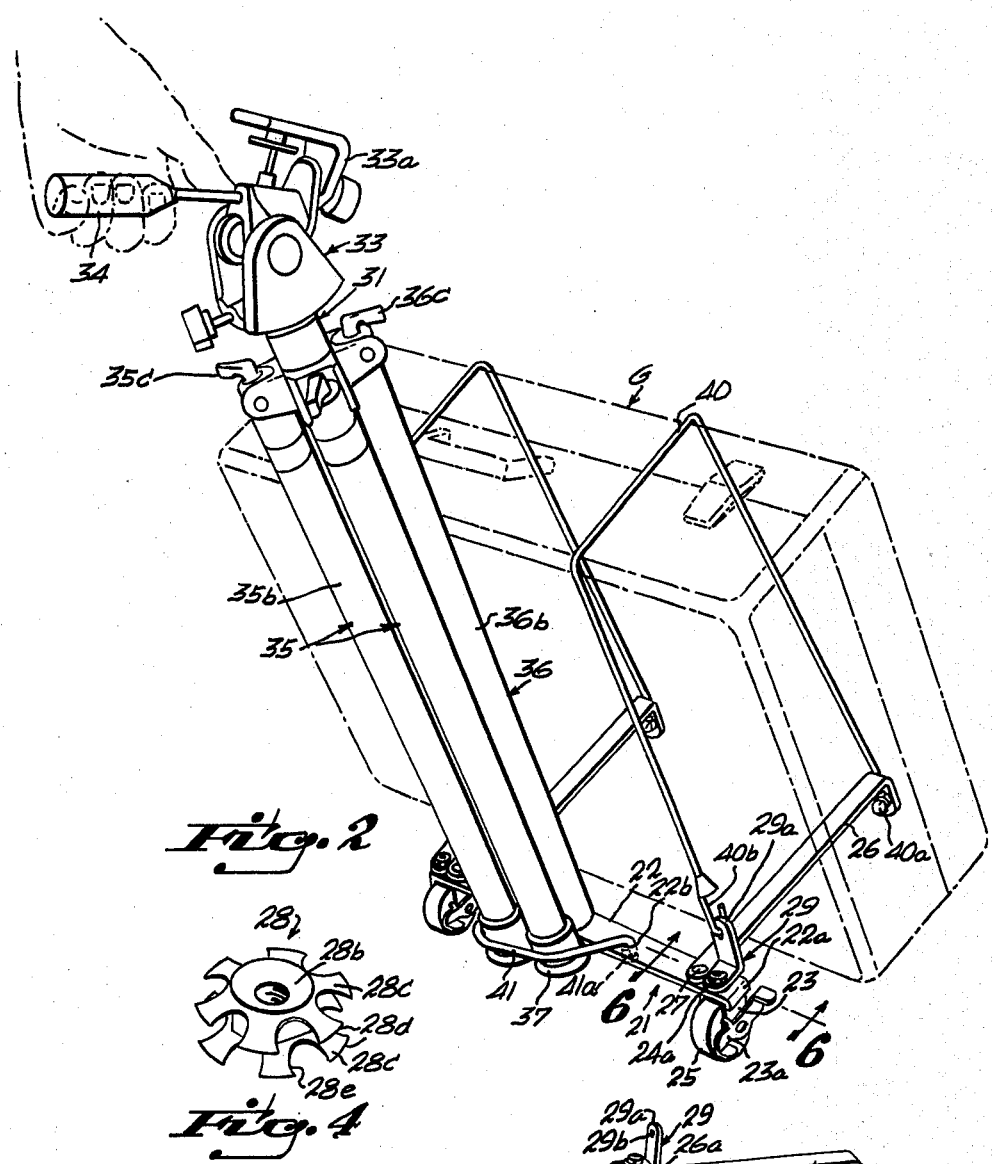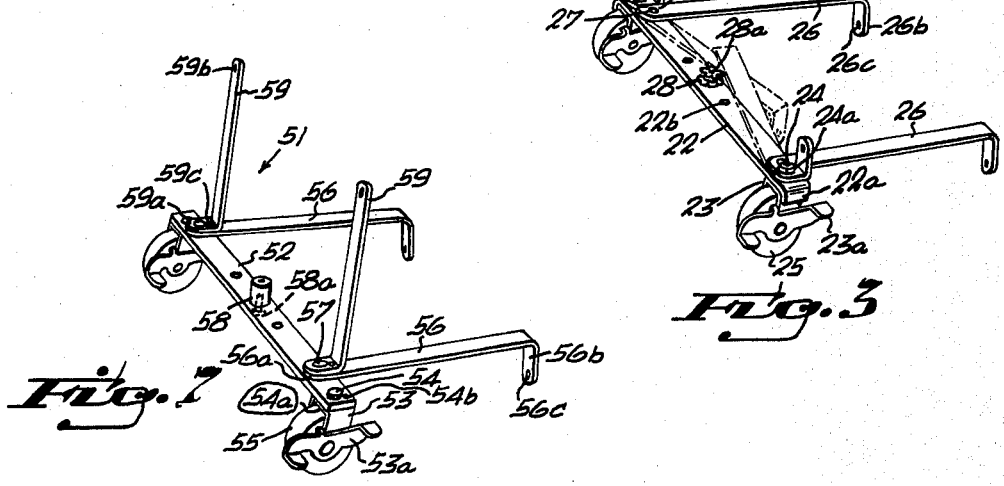

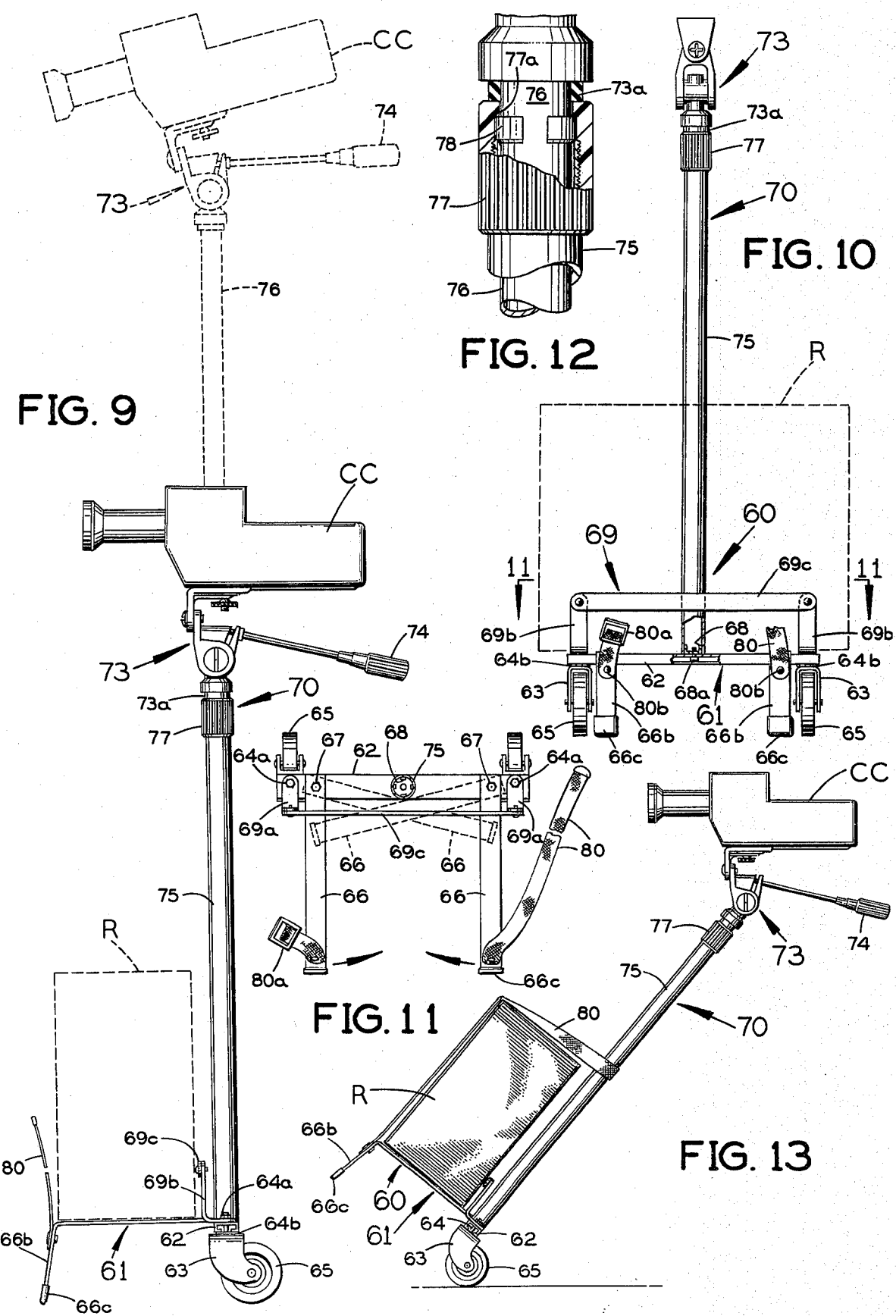

COLLAPSIBLE CARTS AND SUPPORTS FOR CAMERAS AND THEIR EQUIPMENT

This is a continuation-in-part of my patent application Ser. No. 26,788, filed Apr. 3, 1979, entitled COMBINED CAMERA TRIPOD AND LUGGAGE CART UNIT, now abandoned.

BACKGROUND OF THE INVENTION

1. Field of the Invention

This invention relates generally to camera supports, such as tripods or unipods, and more particularly is directed to a collapsible cart and camera support unit in which the tripod or unipod forms part of a two-wheeled equipment carrying cart for transporting the tripod or the unipod on which the camera is mounted along with photographic equipment and accessories and/or other luggage.

2. Description of the Prior Art

Cameras, photographic equipment, supplies and accessories are usually carried in gadget bags which are placed on the ground while the photographers, both amateur and professional, do their work thereby subjecting such gadget bags to being forgotten, stolen, or at the very least, soiled or damaged. Tripods with their versatile yet bulky pan heads and operating handles are usually carried separately in collapsed condition. Together, the collapsed tripod and gadget bag present difficulty in carrying from place to place even when the tripod is strapped to the bag or when the latter has a sufficiently large interior capacity to accommodate the tripod. Photographers all share this long existing need for alleviating the inconvenience and burdensomeness of transporting their photographic equipment from place to place as well as a need for a platform on which the gadget bag may be placed while working.

Recent developments in video cameras and equipment for recording movies on video tape cassettes have created a present need for a light weight, relatively inexpensive and easily manipulatable two-wheel cart which will include a separable unipod to adjustably support the pan head of the video camera while photographing and also provide a platform support for the video cassette recorder enabling the camera and recorder to be wheeled from place to place as a unit.

A preferred embodiment of the invention is shown herein as a cart and camera support unit having a telescoping tripod leg construction wherein the inner tube section is positioned at the upper end of the leg and the outer tube forms the bottom ground engaging section so that the locking mechanism between the sections may be similar to that disclosed in my prior U.S. Pat. No. 3,259,407, granted July 5, 1966 and entitled Lock For Telescoping Tubes.

SUMMARY OF THE INVENTION

Among the objects of the invention is to satisfy the hereinbefore described needs by providing a two-wheeled cart capability to collapsible tripods of the various popular telescoping leg constructions and to unipods, which capability shall be accomplished by a simple, yet sturdy accessory which is relatively inexpensive to manufacture and easy to connect as an attachment to one of the legs of such tripod or to the unipod by the manufacturer, the retailer, or by the consumer. The cart accessory shall include a collapsible platform which, when extended in operative position, shall accommodate a photo-equipment, gadget bag, a video cassette recorder or luggage thereon while the tripod or unipod, with pan head and camera mounted thereon, is in a retracted and collapsed condition for transporting on the wheels in an inclined position as a cart and camera support unit. The extended platform provides two feet coacting with the wheels as a four point ground engaging support for the unit with the platform disposed horizontally when at rest and permitting the platform to serve as a supporting base for the unipod in its extended upstanding operative position. The platform, when not is use, shall be collapsible into a compact condition and be readily separable from the attached tripod or unipod leg, the two separated and collapsed components being sized to fit beneath aircraft passenger seats as carry-on articles.

The invention features the cart and camera support unit which combines a two-wheeled photo-equipment cart with any one of a variety of conventional collapsible camera tripods or unipods serving as the camera supports, each having a pan head provided with a manipulating and locking handle projecting therefrom. In reference to the tripod, the pan head is mounted on a base to which the telescoping length-adjustable legs are pivotally attached at the upper ends thereof for movement from a diverging operative position to a retracted parallel relation. The conventional ground engaging non-slip tip or cap of one of the tripod legs is replaced by a component of a connecting means acting between the two-wheeled cart and the tripod leg. The photo-equipment cart comprises an elongated transverse bar supported by the two wheels located at opposite ends thereof and on which bar are mounted a collapsible platform, a pair of symmetrically spaced upstanding stops as a rear luggage barrier, and the other component of the connecting means which is centrally located on the upfacing surface of the transverse bar to removably engage the first component for securing the cart to the tripod leg with the transverse bar disposed perpendicularly to the longitudinal axis of the leg. The collapsible platform comprises a pair of bars, each having one end pivotally mounted on the transverse bar spaced symmetrically on opposite sides of the connecting means and an opposite free end downturned to form a ground engaging foot. The platform is in extended operative position for supporting photo-equipment thereon when the bars are in parallel relation and perpendicular to the transverse bar wherein the feet cooperate with the two wheels as a four point support enabling the cart and tripod unit, when at rest, to carry the photo-equipment or other luggage on the platform and dispose the collapsed tripod in a vertical position. Elastic cord tie-downs are provided for removably retaining the equipment on the platform. The platform collapses by pivoting the free ends of the bars toward each other in overlapping relation against the transverse bar.

Another embodiment of the invention utilizes a unipod in place of the tripod leg in its separable attachment to the transverse bar so that the four point ground engaging support of the platform afforded by the two wheels and two feet provides a stable base for the unipod while serving as a vertical support for the pan head and camera while in operation.

A feature of the invention is the simplicity of the separable connection between the tripod or unipod leg and the cart. After the ground engaging non-slip cap is removed, the female component of the connecting means is readily force fitted into the bore of the tripod or unipod leg and locks in a concealed operative position enabling quick and easy attachment of the cart to the tripod or unipod and also removal therefrom, the cap being replaceable without disturbing the female component in its concealed position.

The handle of the camera pan head, when properly orientated, provides a convenient handle for wheeling the cart and camera support unit in a conventional, luggage cart, inclined position wherein the platform feet are raised out of ground contact. Strap means, located adjacent the non-slip caps, binds all three retracted tripod legs together while the cart unit is being wheeled.

BRIEF DESCRIPTION OF THE DRAWINGS

FIG. 1 is a perspective view of a cart and camera support unit constructed to embody the invention utilizing a tripod and pan head as the mounting for a camera and the tripod legs spread apart in operative position, a gadget bag being shown in broken lines positioned on the platform of the two-wheeled cart.

FIG. 2 is a perspective view of the unit shown in FIG. 1 but with the tripod in a fully collapsed condition and the unit being wheeled by the pan head handle, the platform having the gadget bag shown thereon in broken lines and secured in place by a pair of elastic cords.

FIG. 3 is a perspective view of the two-wheeled cart embodying the invention provided as an accessory, the platform bars being shown in full lines in extended operative position and in broken lines in collapsed position, the female component of the connecting means being shown engaging the male component prior to being press fitted into the bore of the tripod leg.

FIG. 4 is an enlarged perspective view of the female connecting means component shown in FIGS. 3 and 5 removed from the unit.

FIG. 5 is an enlarged sectional view taken on line 5—5 in FIG. 1 showing details of the connecting means between the tripod leg and the cart.

FIG. 6 is an enlarged sectional view taken on line 6—6 in FIG. 2 showing details of the mounting of the platform bars, the caster forks and the upstanding stops of the front barrier on the transverse bar of the cart.

FIG. 7 is a view similar to FIG. 3 but showing a modified cart construction.

FIG. 8 is a view similar to FIG. 5 but showing the connecting means of the cart shown in FIG. 7 mounted on a tripod leg wherein the inner tube section is positioned at the lower end of the leg.

FIG. 9 is a side elevational view of a cart and camera support unit embodying the invention but utilizing a unipod and pan head as the mounting for a video camera and the platform of the cart as a support for the video cassette recorder indicated in broken lines, the unipod, pan head and camera being shown in full lines in a fully retracted rest position and indicated in broken lines in an extended operative position.

FIG. 10 is a front elevational view of the unit shown in FIG. 9, the camera being removed from the pan head and the video cassette recorder being indicated in broken lines.

FIG. 11 is a sectional view taken on line 11—11 in FIG. 10, the platform bars being shown in full lines in extended operative position and indicated in collapsed position in broken lines.

FIG. 12 is an enlarged detail view of the releasable clamping mechanism between the lower outer and upper inner tube sections of the unipod with parts broken away to show interior structure, and FIG. 13 is a side elevational view of the unit shown in FIG. 9 being wheeled by the pan head handle, the video cassette recorder being shown strapped in place.

DESCRIPTION OF THE PREFERRED EMBODIMENTS

Referring in detail to the drawings, 20 generally denotes a cart and tripod unit, constructed to embody the invention, seen in FIGS. 1, 2 and 5 to comprise the combination of a camera tripod 30 with a two-wheeled cart 21 shown in FIG. 3 as an add-on accessory.

Tripod 30 may be of any conventional construction seen to generally comprise a base 31 having a central bore through which vertical extension tube 32 extends, the latter mounting a conventional universally adjustable pan head 33 on the upper end thereof. Pan head 33 includes a radially extending handle 34 which, in the well understood manner, serves as a means for manually positioning camera C with respect to the vertical axis (azimuth) and a horizontal axis (inclination), namely, the axis for tilting camera C in the front to rear plane in which the longitudinal axis of handle 34 extends. Handle 34 also serves by axial rotation thereof to lock the pan head 33 with respect to the inclination axis and in some pan head constructions also locks the azimuth rotation. Pan head 33 may also include a camera mounting means 33a which pivots on a third axis extending perpendicularly to the other two axes providing for tilting camera C in the side to side plane and may have a separate handle (not shown) for this adjustability.

All three legs of tripod 30, shown in FIGS. 1 and 2, are similar in construction to those described in my hereinbefore mentioned patent and, for identification purposes, two of the legs are each designated numeral 35, while the third leg, to which cart 21 is attached, is designated numeral 36. Legs 35 and leg 36 are seen to comprise upper, inner tubes 35a and tube 36a and lower, outer tubes 35b and tube 36b, respectively. The upper ends of tubes 35a and tube 36a are pivotally attached to the periphery of base 31 and have projecting finger manipulating tabs 35c and tab 36c, respectively, for actuating the locking means between the inner and outer tubes as per my above mentioned patent. The bottom ends of outer tubes 35b are fitted with conventional ground engaging non-slip caps 37 while the latter is omitted or removed from outer tube 36b to accommodate the attachment of cart 21 in the manner hereinafter fully described.

As seen in FIG. 3, an elongated transverse bar 22 mounted on wheels 25 comprises the primary horizontal supporting member of cart 21 and also of cart and tripod unit 20 when tripod 30 is collapsed for transport. Wheels 25 may each be mounted in a caster fork 23, one located at each opposite end of transverse bar 22, for rotation on a fixed axis below and parallel to the longitudinal axis of bar 22. Each caster fork 23 and wheel 25 may be of any conventional construction and provided with a toe operated locking lever or brake 23a for wheel 25. Transverse bar 22 may terminate in downturned opposite ends 22a against each of which one of the caster forks 23 is mounted by suitable fastening means, such as, bolt 24 and nut 24a. Bolt 24 extends through aligned openings formed in the horizontal cross-piece of caster fork 23 and in transverse bar 22 adjacent downturned end 22a, the latter serving to fix the abutting caster fork 23 against rotation on bolt 24.

A pair of spaced bars 26, each having one end 26a pivotally secured by a suitable pivot pin 27 to transverse bar 22 inwardly of bolts 24, serves as a collapsible platform for cart 21. The other free end of each bar 26 is downturned to provide short vertical legs 26b which coact with wheels 25 as a four point support for the rest position of cart and tripod unit 20. Pivot pin 27, as seen in FIG. 6, may be of the quick assembly type fastener having a push-on cap-shaped speed nut 27a and utilizing a split spring washer 27b providing spring tension to the pivoted connection.

The separable connecting means between tripod leg 36 and cart 21 is shown in FIGS. 3, 4 and 5 to comprise a threaded male component mounted to upstand from the center of transverse bar 22 as by bolt 28a threaded through an opening in bar 22 and secured therein by a suitable bonding material, and a female component shown in FIG. 4 as tube connector 28 having a hub 28b formed with a threaded axial bore for receiving bolt 28a therein. Tube connector 28, being of a known construction, has a pair of concavo-convex spring washers between which hub 28b is sandwiched and which are formed with cutouts 28e providing spaced resilient grippers 28c having sharp peripheral edges 28d. When forced convex end first into the bore of lower tube 36b, engagement of the tubular wall by edges 28d prevent removal of and lock female component 28 in position.

Upstanding stops are provided on transverse bar 22 as a rear barrier for cooperating with leg 36 in preventing gadget bag G or other luggage placed on cart 21 from sliding off the platform when cart and tripod unit 20 is in a rearwardly inclined wheel transporting position. Such stops, as seen in FIGS. 1, 2, 3 and 6, are provided on transverse bar 22 as angle bars 29 secured by bolts 24 and having upstanding portions 29a aligned with the platform facing side of transverse bar 22.

Strap means is also provided to bind collapsed legs 35 to leg 36 when cart and tripod unit 20 is in the transport position shown in FIG. 2. To this end, openings 22b are formed in transverse bar 22 symmetrically spaced with respect to male component 28a for mounting a strap means in the form of short elastic cord 41. The latter extends between openings 22b with opposite end portions passing therethrough and being suitably anchored as by enlarged folded and stapled ends or knots 41a.

As seen in FIGS. 2 and 3, short vertical legs 26b and upstanding portions 29a may be formed with openings 26c and 29b, respectively, adjacent the free ends thereof for attaching the opposite ends of elastic retaining cords 40 which may be provided to pass over and secure gadget bag G or other luggage placed on cart 21, all in the well understood manner. One end of each cord 40 may be anchored to cart 21, as by the enlarged folded and stapled or knotted end 40a at opening 26c and the opposite end provided with a hook 40b for removably engaging opening 29b.

The practical utility and operation of cart and tripod unit 20 will now be apparent. The preparation of lower tube 36b of tripod 30 for its removable attachment to cart 21 after removal of cap 37 simply entails threading female component 28 onto the male component 28a with the convex side facing upward and the peripheral edges 28d of the lower grippers 28c spaced a short distance above the surface of transverse bar 22. Female component 28 is then forced into the open end of lower tube 36b until the latter snugly abuts transverse bar 22 and component 28 is locked in position completely within tube 36b as shown in FIG. 5. Thereafter, transverse bar 22 may be rotated to take up any slack and thereby complete the attachment. With transverse bar 22 secured to leg 36, lower tube 36b may be released for rotation with respect to upper tube 36a to dispose transverse bar 22 in the desired tangential relation with respect to tripod 30 as shown in FIG. 1.

Platform bars 26 are pivoted to their extended position against angle bars 29 which also serve as limiting means for the parallel alignment of bars 26 with each other in perpendicular relation to transverse bar 22.

Tripod 30 of unit 20 functions in substantially the conventional manner, but wheels 25, which replace a non-slip cap as the ground engaging means for leg 36, are locked by depressing the toe operated brake levers 23a to prevent any undesirable movement due to possible rolling of unlocked wheels 25. In this operative position of tripod 30, as seen in FIG. 1, the platform of carrier 21 is available for placing thereon gadget bag G or other articles while pictures are being taken. To move unit 20 to another picture taking position without collapsing tripod 30, legs 35 are simply folded against leg 36 and brake levers 23a released, freeing unit 20 for manipulation by handle 34 to roll on wheels 25 to the next picture taking position while gadget bag G remains in position on the platform.

Transformation of cart and tripod unit 20 from its tripod function shown in FIG. 1 to a luggage cart is readily accomplished by collapsing the tripod legs and securing legs 35 against leg 36 by short elastic cord 41 as shown in FIG. 2. Tripod handle 34 may then be orientated to project forwardly with respect to the cart 21 and slightly upwardly to serve as a convenient handle for manipulating unit 20 on wheels 25 in the inclined position as is clear from FIG. 2. Gadget bag G and/or other luggage may be secured in position on platform bars 26 by the pair of elastic cords 40, hooks 40b being removably secured to any convenient structure on tripod 30, such as, the radially extending pivot supports of legs 35 on base 31, or, as seen in FIG. 2, in openings 29a of angle bars 29.

It will also be clear that when not being pulled along by handle 34 on wheels 25 in the inclined position shown in FIG. 2, cart and tripod unit 20 may be at rest with tripod 30 extending vertically and platform bars 26 disposed horizontally whereby short vertical legs 26b engage the ground and cooperate with wheels 25 as a stable four point support.

To separate cart 21 from tripod 30 when the luggage carrier capability of the unit is no longer required or to provide a more compact arrangement of components, as for fitting beneath the seat of an aircraft as carry-on articles, platform bars 26 may first be pivoted toward each other to overlap and lie against transverse bar 22 in the collapsed position shown in broken lines in FIG. 3. Transverse bar 22 is then rotated with respect to the lower leg tube 36b in a counter-clockwise direction to unscrew bolt 28a from tube connector 28. Elastic cords 40 may then be neatly wrapped around transverse bar 22 and platform bars 26 in collapsed position, and hooks 40b engaged in openings 29a, thus providing the separated cart 21 in compact, portable form. For use of tripod 30 without reassembly with cart 21, a non-slip cap 37 may be slipped onto the bottom end of lower tube 36b without interference by tube connector 28, cap 37 being readily removable for reassembly of unit 20.

In keeping with the scope of the invention contemplating use of a wide variety of tripods and extendable leg constructions in combination with cart 21 as well as various modifications of the latter in achieving the hereinbefore described desired capabilities of cart and tripod unit 20, FIG. 8 shows a tripod leg 46 having an upper, outer tube 46a, a lower, inner tube 46b and a locking collar 46c therebetween, all of conventional construction. An example of a locking collar construction is shown in FIG. 12 and hereinafter described. While it is clearly understood that a female component of the separable connecting means such as connector 28 will function with lower, inner tube 46b of leg 46 in substantially the same manner as hereinbefore described with respect to lower, outer tube 36b of leg 36, FIG. 8 shows the female component as a plug 58 having a threaded axial bore for engaging male component, threaded bolt 58a. Plug 58 is secured in tube 46b by a set screw 46d which may also extend through belt 42, securing the latter to tube 46b. Belt 42, serving as an alternative to short elastic cord 41, may have a buckle (not shown) for releasably fastening the other two tripod legs to leg 46.

FIG. 7 shows a modified form of cart 51 comprising an elongated transverse bar 52 mounting wheels 55 in caster forks 53 provided with toe operated brakes 53a. Caster forks 53 are attached by bolts 54 and nuts 54a and are provided with suitable means for preventing relative rotation between caster forks 53 and transverse bar 52, for example, downturned ends of the latter similar to ends 22a of cart 21 (not shown), or roll pins 54b extending through aligned openings in transverse bar 52 and in the horizontal cross-piece of caster fork 53.

Spaced platform bars 56, which function in a manner similar to bars 26 of cart 21, are each pivoted at one end 56a thereof on a pivot pin 57 which may likewise be similar to pivot pin 27 of carrier 21. Each bar 56 has an opposite free end downturned as a short vertical leg 56b which may also have an opening 56c for anchoring an elastic retaining cord 40 thereto. Upstanding stops to serve as rear barrier means are provided as angle bars 59, being alternatively somewhat higher than comparable angle bars 29 of cart 21. Cart 51 also illustrates an alternative location for angle bar 59 wherein attachment ends 59a are mounted by pivot pins 57 on pivoted ends 56a of platform bars 56 and are fastened to pivot with the latter by roll pins 59c in the well understood manner so that upstanding bars 29 align with the platform facing side of transverse bar 52 when platform bars 56 are in the extended, operative position shown in FIG. 7. Openings 29b are formed at the upper ends of angle bars 59 for releasable engagement by hooks 40b of elastic cords 40.

Transverse bar 52 has bolt 58a secured to upstand from its center in the manner similar to bolt 28a of cart 21 thereby providing for separable assembly of cart 51 with a tripod leg fitted with a female component, such as, component 28 or 58.

The invention also contemplates the separable attachment of cart 21 or 51 to tripods having extendable legs of cross-section other than circular, such as, channel-shaped or triangular, by adapting to such legs female components of the connecting means comparable to self-locking tube connector 28 or a fitted plug retained by a set screw comparable to plug 58 or the like.

A cart and camera support unit particularly directed to video cameras and their recording equipment is shown in FIGS. 9 to 13, inclusive, as cart and unipod unit 60 comprising a two-wheeled cart 61 separably mounting unipod 70 herein shown to include a pair of telescoping tubes, namely, an outer, lower tube 75 and inner, upper tube 76. Video camera CC may be mounted on a conventional universally adjustable pan head 73 having handle 74, similar to pan head 33 and handle 34 of tripod 30, pan head 73 being attached to the upper end of tube 76. Any conventional means may be provided to releasably lock telescoping tubes 75 and 76 in relative adjusted positions. FIG. 12 illustrates a locking means seen to include a collar 77 internally threaded onto external threads terminating the upper end of outer tube 75 and a split ring 78, made of tough plastic material, such as nylon, located within collar 77 and surrounding the portion of inner tube 76 projecting from the upper end of outer tube 75. Split ring 78 has a bottom feathered edge adapted to extend between the tubes 75 and 76 and lock the two together as pressure is applied to the upper edge of ring 78 by the inwardly projecting flange 77a of collar 77 when the latter is threaded downwardly onto outer tube 75. A resilient ring 73a also surrounds inner tube 76 above collar 77 to damp any impact of pan head 73 against collar 77 due to uncontrolled or accidental retraction of unipod 70.

Cart 61 comprises elongated transverse bar 62 mounting beneath and at opposite ends thereof caster forks 63 with wheels 65, and mounting on the upfacing side of bar 62 a barrier assembly 69, a pair of spaced pivoted bars 66 providing the collapsible platform, and the male member 68a of the separable connecting means between cart 61 and unipod 70. Transverse bar 62 may be of solid construction similar to bar 52 of cart 51, or as seen in FIGS. 9 and 13 may be an extrusion to provide light weight and rigidity having a center bore substantially rectangular in cross-section and a longitudinal centralized slot on one surface, herein shown as the bottom surface, communicating with the center bore.

Each of the spaced bars 66 has one end 66a thereof pivotally secured to transverse bar 62 by a suitable pivot pin 67. The opposite free end of each bar 66 is downturned to provide vertical legs 66b which may terminate in plastic caps 66c for ground engagement and coaction with wheels 65 as the four point support for unit 60.

The separable connecting means between unipod 70 and cart 61 includes bolt 68a as the threaded male component attached to upstand from the center of transverse bar 62 in a manner similar to bolt 28a of transverse bar 22, and tube connector 68 as the female component secured in the bottom end of lower tube 75 in the same manner as connector 28 is secured in lower tube 36b of tripod leg 36.

Rear barrier assembly 69 includes a pair of angle bars 69a having upstanding portions 69b, the upper ends of which are connected by transverse member 69c, portions 69b and member 69c being located forwardly of transverse bar 62 and unipod 70, as seen in FIGS. 9, 11 and 13. Bolts 64 and nuts 64a serve to secure both the caster forks 63 and angle bars 69a to transverse bar 62, a lock washer 64b being provided on bolt 64 between caster fork 63 and bar 62 to prevent relative movement therebetween.

A suitable strap means is also provided for cart 61 to retain video recording equipment R or other luggage on the platform formed by spaced bars 66 and against rear barrier assembly 69. Such strap means may be elastic retaining cords similar to cords 40, or, as here shown, may be a two section luggage strap 80 of woven fabric webbing, each section being permanently attached at one end to vertical legs 66b by suitable rivets 80b, the other ends of the sections being releasably and adjustably secured together by a buckle 80a attached to one of the sections in the well understood manner.

Electric wiring between camera CC and equipment R, which usually connects to one or both components by removable terminal plugs, has been omitted from the drawings.

The operation of cart and unipod unit 60 will be clear from FIGS. 9 and 13, the weight of video recording equipment R on extended bars 66 contributing to the stability of unipod 70 and camera CC while the latter is in operation with the aid of handle 74. Unipod 70 is readily separated from cart 61 by unscrewing the connecting means components 68 and 68a, and bars 66 folded against transverse bar 62 in the same manner and for the same purpose as hereinbefore described for cart 21 and tripod 30. When unipod 70 is separated from cart 61, a non-slip ground engaging cap, similar to caps 37 of tripod 30 may be slipped onto the bottom end of outer tube 75 concealing tube connector 68 and completing unipod 70 for its usual intended use.

Cart and camera support units and the two-wheeled cart constructions for separably connecting to the bottom ends of one of the legs of conventional camera tripods or to unipods herein disclosed are seen to achieve the several objects of the invention and to be well adapted to meet conditions of practical use. As various possible embodiments might be made of this invention, and as various changes might be made in the disclosed units and cart constructions, it is to be understood that all matters herein set forth or shown in the accompanying drawings are to be interpreted as illustrative and not in a limiting sense.

What is claimed is:

1. A cart and camera support unit comprising a two-wheeled cart, a camera support having a sectionalized tubular telescoping leg which carries at an upper end thereof a pan head with a laterally projecting handle for manipulating and locking the head in selective adjusted positions including a rearwardly and upwardly extending position to serve as a manipulative handle for the cart and camera support unit, and separable connecting means coacting between the lower end of the leg and the two-wheeled cart, said cart comprising a transverse bar supported at each opposite end by one of said wheels mounted in a caster fork attached beneath said bar, means securing each of said caster forks against relative rotation with respect to said transverse bar, a component of said connecting means being located on said transverse bar midway between said wheels and formed as an upstanding threaded male member, a collapsible platform for equipment formed by a pair of bars, each having one end pivotally mounted on the transverse bar spaced symmetrically on opposite sides of said connecting means component and adapted when in operative position to extend in parallel relation in a forward direction and in perpendicular relation to said transverse bar and to pivot toward each other in an overlapping relation and against said transverse bar in collapsed position, an opposite free end of each of said platform bars being downturned to form a ground engaging foot coacting with said wheels as a four point support disposing said platform horizontally in rest position, a pair of symmetrically spaced upstanding stops secured to said transverse bar for engaging said equipment when said platform is tilted rearwardly by manipulation of said handle in said rearwardly and upwardly extending position for rolling the unit on said wheels, and a female member of said connecting means formed as an internally threaded self-locking connector press fitted into the bore of said tubular leg at the bottom end thereof and located to separably engage said male member.

2. The unit defined in claim 1 in which said upstanding stops include a pair of angle bars, each of said caster forks having a horizontal cross-piece, each of said caster fork securing means including a bolt extending through the cross-piece and transverse bar and through an end section of one of said angle bars as the securing means therefor.

3. The unit defined in claim 1 in which said telescoping leg is one of the legs of a tripod, strap means attached to said transverse bar for retaining the other two legs of the tripod in a collapsed position against said first leg when the legs are retracted and the tripod serves as a vertical center post for the unit, said strap means being an elastic cord attached by opposite ends thereof being enlarged and anchored in a pair of openings formed in said transverse bar on opposite sides of said connecting means component.

4. The unit defined in claim 2 in which said transverse bar has downturned opposite ends, said bolts extending through the transverse bar at locations adjacent said downturned ends, the caster fork cross-pieces abutting the downturned ends as said retention against rotation of the caster forks on the bolts.

5. The unit defined in claim 1 in which said telescoping leg is one of the legs of a tripod and the two wheels of said cart serve as a ground engaging means cooperating with ground engaging means terminating each of the other legs of the tripod when the tripod legs are spread apart in operative position whereby said platform is tilted and said platform bar feet are raised from ground contact, and a toe operated locking means coacting with each of said caster forks and wheels for selectively locking the wheels against rotation to cooperate with the other two tripod ground engaging means in preventing slipping of the tripod when in said operative position.

6. The unit defined in claim 1 in which said telescoping leg is a unipod which is vertically disposed in an operative camera supporting position when said platform is in said four point ground engaging rest position whereby the weight of equipment carried by said platform contributes to the stability of the unipod.

* * * * *